United States Patent
Chiu et al.

(10) Patent No.: US 8,334,682 B2
(45) Date of Patent: Dec. 18, 2012

(54) BUCK CONVERTER WITH INTERNAL RIPPLE COMPENSATION

(75) Inventors: Liang-Hsiang Chiu, Hsinchu County (TW); Shun-Nan Tai, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 305 days.

(21) Appl. No.: 12/837,521

(22) Filed: Jul. 16, 2010

(65) Prior Publication Data

US 2011/0234188 A1    Sep. 29, 2011

(30) Foreign Application Priority Data

Mar. 25, 2010    (TW) ................. 99108881 A

(51) Int. Cl.
    *G05F 1/00*    (2006.01)
(52) U.S. Cl. ......... 323/282; 323/283; 323/284; 323/285
(58) Field of Classification Search .......... 323/271, 323/282, 283, 284, 285
    See application file for complete search history.

(56) References Cited

U.S. PATENT DOCUMENTS

| 7,545,134 B2* | 6/2009 | Harriman ............ 323/351 |
| 2006/0284609 A1* | 12/2006 | Weng et al. ........ 323/286 |
| 2007/0222423 A1* | 9/2007 | Chen et al. ........ 323/283 |
| 2008/0088292 A1* | 4/2008 | Stoichita et al. ........ 323/285 |

* cited by examiner

*Primary Examiner* — Nguyen Tran
(74) *Attorney, Agent, or Firm* — Winston Hsu; Scott Margo

(57) ABSTRACT

A buck converter with internal ripple compensation includes a comparator for generating a comparison result, a constant-on-time trigger coupled to the comparator for generating a trigger control signal according to the comparison result, a pre-driver coupled to the constant-on-time trigger for controlling a high side switch and a low side switch, an output module coupled to a first node and a signal output end, and a ripple compensation circuit coupled to the high side switch, the low side switch, the first node, and the comparator for generating a compensation signal outputted to the comparator.

43 Claims, 16 Drawing Sheets

BUCK CONVERTER WITH INTERNAL RIPPLE COMPENSATION

BACKGROUND OF THE INVENTION

1. Field of the Invention

The present invention relates to a buck converter, and more particularly, to a buck converter capable of direct current (DC) offset cancellation and internal ripple compensation.

2. Description of the Prior Art

With advanced development in technology, various electronic products, such as a notebook, a mobile phone, a personal digital assistant, a multimedia player, etc., have been presented and are utilized widely in daily life. In general, a power converter is required for providing operating power for the electronic products. Furthermore, the power converter is capable of converting a high voltage AC power or DC power to a low voltage and stable DC power for operation of the electronic products. The buck power converter is one type of power converter, which can offer advantages of simplicity, low cost, and high efficiency. Therefore, the buck power converter has widely been applied in various electronic products.

Please refer to FIG. 1, which is a schematic diagram of a buck converter 10 with constant on time control scheme according to the prior art. The buck converter 10 is utilized for converting an input voltage $V_I$ into a stable output voltage $V_O$ for a load Load. The buck converter 10 includes a comparator 102, a constant-on-time trigger 104, a pre-driver 106, a high side switch HS, a low side switch LS, an output inductor $L_O$, an equivalent series resistor ESR, and an output capacitor $C_O$. The interconnections of the units of the buck converter 10 are as shown in FIG. 1 and further description is omitted for brevity. The comparator 102 generates a comparison result CMP, which is outputted to the constant-on-time trigger 104, according to a reference voltage $V_{REF}$ and a feedback voltage $V_{FB}$. The constant-on-time trigger 104 generates a trigger control signal $S_{TON}$ having a fixed on-time period $T_{ON}$, which is outputted to the pre-driver 106. The pre-driver 106 generates a first pre-driving signal UG and a second pre-driving signal LG to control an on/off state of the high side switch HS and the low side switch LS according to the trigger control signal $S_{TON}$. For example, during an on-time period $T_{ON}$, the high switch HS is switched into an on state and the low switch LS is switched into an off state. Similarly, during an off-time period $T_{OFF}$, the high switch HS is switched into an off state and the low switch LS is switched into an on state. Furthermore, when the on-time period $T_{ON}$ is a fixed value, the length of the off-time period $T_{OFF}$ depends on level of the feedback voltage $V_{FB}$. In other words, the off-time period $T_{OFF}$ is modulated for output voltage regulation by a negative feedback mechanism. For example, during the off-time period $T_{OFF}$, as the output voltage $V_O$ (i.e. the feedback voltage $V_{FB}$) is lower than the reference voltage $V_{REF}$, the next switching cycle period is triggered (i.e. the next on-time period $T_{ON}$ begins). However, when the equivalent series resistor ESR is too small, the ripple voltage generated by the equivalent series resistor ESR may become too small. As a result, a sub-harmonic oscillation occurs, thus, the buck converter 10 becomes unstable. Please refer to FIG. 2, which is a schematic diagram of signal waveforms of the buck converter 10 shown in FIG. 1 when the buck converter 10 powers a heavy load and the equivalent series resistor ESR is 0.05 milliohms. As shown in FIG. 2, when the buck converter 10 transitions from a light load state (at the period T1) into a heavy load state (at the period T2), i.e. the inductor current $I_{LO}$ of the output inductor $L_O$ changes from 1 ampere to 5 amperes, each voltage signal becomes unstable after the period T1, thus the whole system becomes unstable. A multi-layer ceramic capacitor (MLCC) is often applied as the output capacitor $C_O$ in high frequency and portable electronic products. However, the equivalent series resistance of the MLCC is relatively small. In the buck converter 10, sufficient equivalent series resistance of the output capacitor $C_O$ is required for generating a suitable ripple voltage for preserving the stable constant on time scheme.

Please refer to FIG. 3, which is a schematic diagram of a buck converter 30 for reducing sub-harmonic oscillation according to the prior art. In the buck converter 30, a substitution resistor Rj placed in the feedback loop replaces the function of the equivalent series resistor ESR shown in FIG. 1, and the stability of the buck converter 30 can be improved by adjusting the substitution resistor Rj. As shown in FIG. 3, a summation voltage signal of the sum of a compensation voltage Vsen and a reference voltage $V_{REF}$ can be provided to the comparator 102. In such a situation, an extra ripple voltage is added to the feedback loop to enhance the output voltage $V_O$ for improving the sub-harmonic oscillation effect. Also, because the substitution resistor Rj is an internal circuit of a chip, the substitution resistor Rj can be controlled to provide a proper resistance for realizing system stability.

Moreover, please further refer to FIG. 1. The prior art can provide an extra ripple voltage for the buck converter 100 by transforming the current sensed from the output inductor $L_O$ to the corresponding voltage and accordingly adding the corresponding voltage to the positive input terminal and/or the negative input terminal of the comparator 102 for improving system stability. Otherwise, in the prior art, the sensed inductor current can be AC-coupled to the positive input terminal and/or the negative input terminal of the comparator 102 for providing an extra ripple voltage for the buck converter 100. However, though adding the extra ripple voltage to the comparator 102 may improve the low ripple voltage problem (resulting from low equivalent series resistor ESR), but the above-mentioned extra ripple voltage added to the feedback loop usually has an extra DC component so that a voltage offset effect may occur on the output voltage $V_O$. For example, please refer to FIG. 4, which is a schematic diagram of signal waveforms of the buck converter 10 shown in FIG. 1 when a load transient occurs. The buck converter 10 is in light load state during the periods T1 and T3, and in heavy load state during the period T2. As can been seen, the voltage offset effect is larger when the load is heavier. For example, in an area A in FIG. 4, it is obvious that a large voltage offset effect occurs during the load transient. In short, the prior art may improve the low ripple voltage problem, but the voltage offset effect of the output voltage still reduces system performance.

SUMMARY OF THE INVENTION

It is therefore a primary objective of the present invention to provide a buck converter with internal ripple compensation.

The present invention discloses a buck converter with internal ripple compensation, comprising: a comparator, comprising a first input terminal, a second input terminal, and an output terminal, for comparing signals received by the first input terminal and the second input terminal to generate a comparison result; a constant-on-time trigger, coupled to the output terminal of the comparator, for generating a trigger control signal according to the comparison result; a pre-driver, coupled to the constant-on-time trigger, for generating a first pre-driving signal and a second pre-driving signal according to the trigger control signal; a high side switch, coupled to the pre-driver and a first node; a low side switch, coupled to the pre-driver and the first node; an output module, coupled between the first node and a signal output end; and a ripple compensation circuit, coupled to the high side switch, the low side switch, the first node, and the comparator for generating a compensation signal outputted to the comparator.

The present invention further discloses a buck converter with internal ripple compensation, comprising: a comparator, comprising a first input terminal, a second input terminal, and an output terminal, for comparing signals received by the first input terminal and the second input terminal to generate a comparison result; a constant-on-time trigger, coupled to the output terminal of the comparator, for generating a trigger control signal according to the comparison result; a pre-driver, coupled to the constant-on-time trigger, for generating a first pre-driving signal and a second pre-driving signal according to the trigger control signal; a high side switch, coupled to the pre-driver and a first node; a low side switch, coupled to the pre-driver and the first node; an output module, coupled between the first node and a signal output end; a ripple compensation circuit, coupled to the high side switch, the low side switch, the first node, and the comparator for generating a compensation signal outputted to the comparator; and a ripple generator, coupled to the ripple compensation circuit, for generating a modulated reference voltage according a reference voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
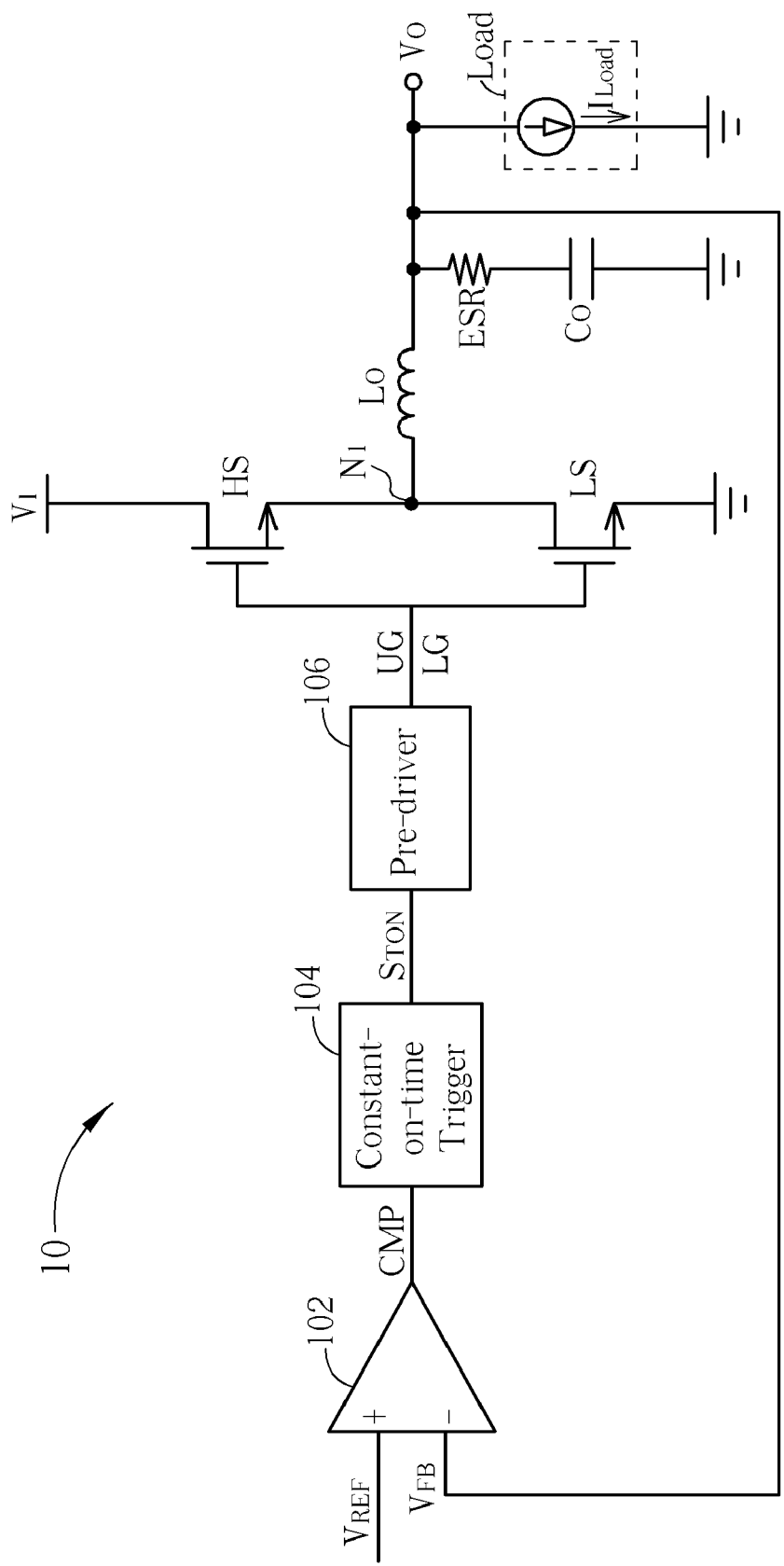
FIG. 1 is a schematic diagram of a buck converter with constant on time control scheme according to the prior art.
Figure 2:
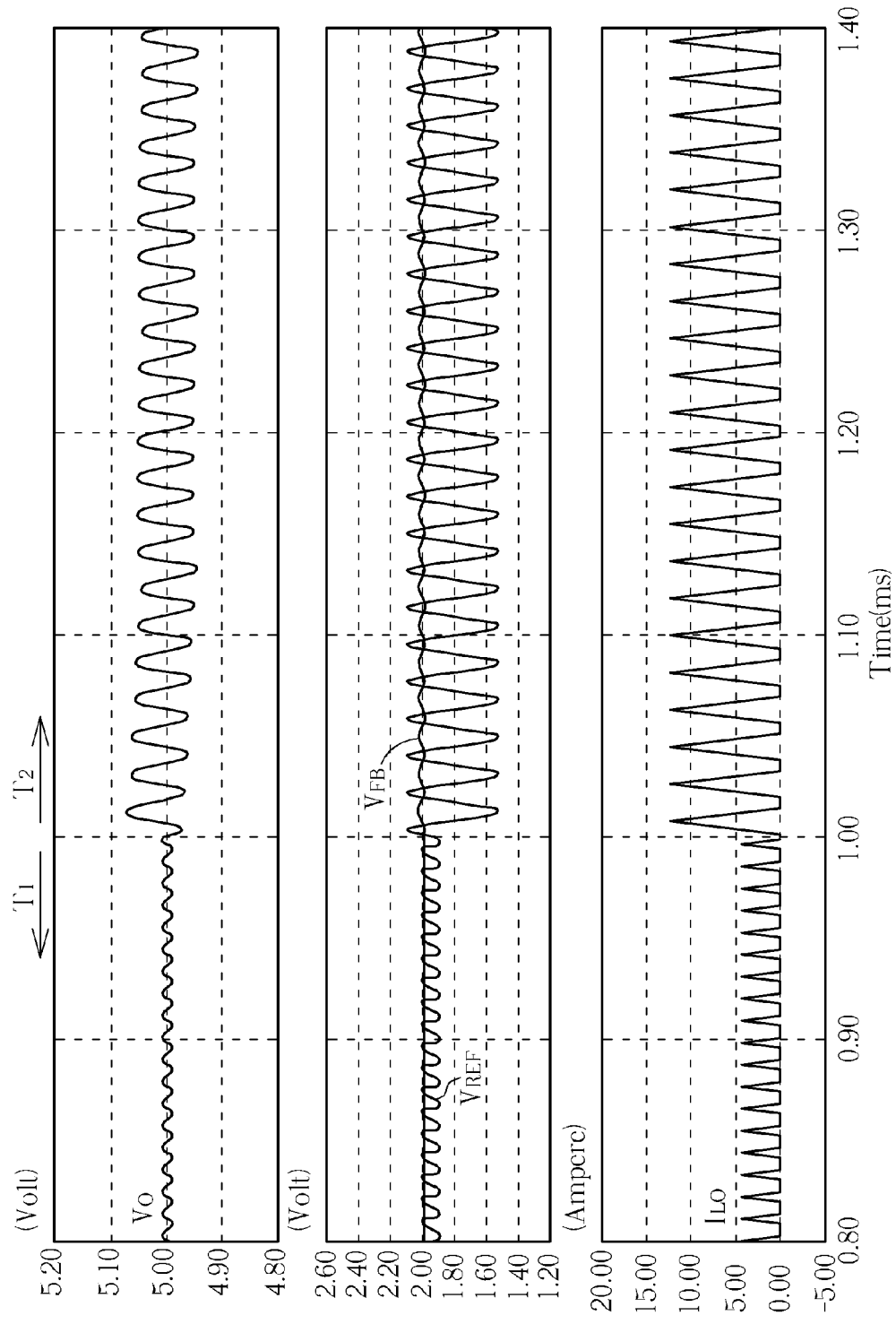
FIG. 2 is a schematic diagram of signal waveforms of the buck converter shown in FIG. 1 while changing from a light load state to a heavy load state.
Figure 3:
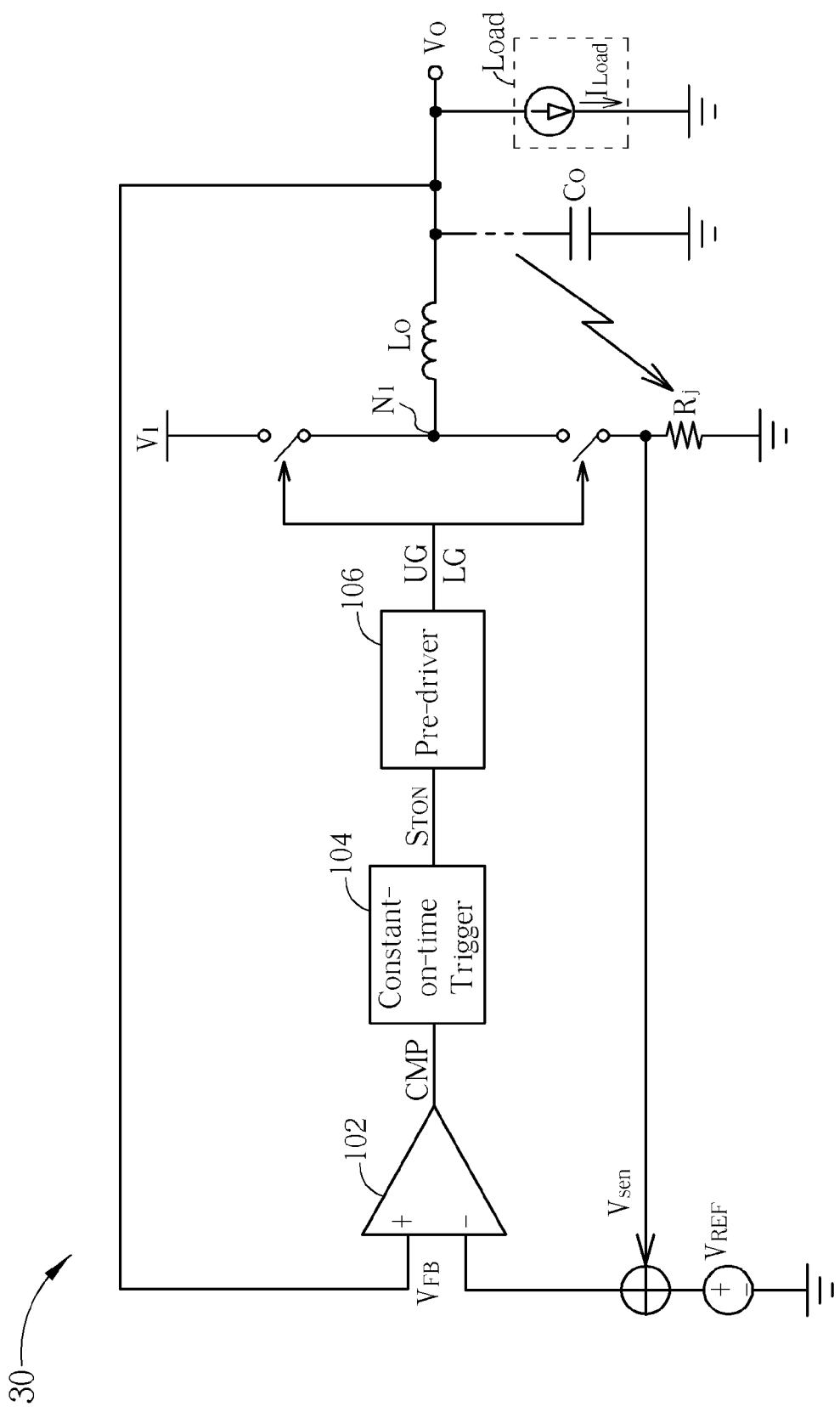
FIG. 3 is a schematic diagram of a buck converter for reducing sub-harmonic oscillation according to the prior art.
Figure 4:
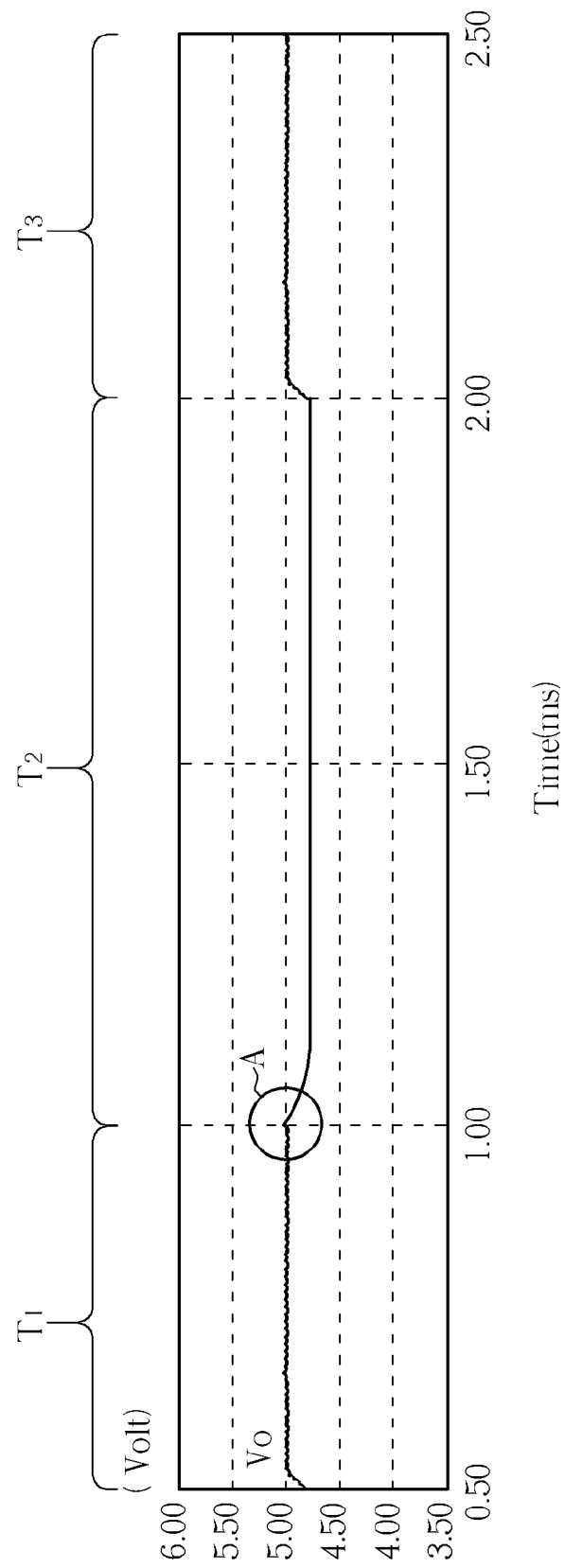
FIG. 4 is a schematic diagram of signal waveforms of the buck converter shown in FIG. 1 during load transient.
Figure 5:
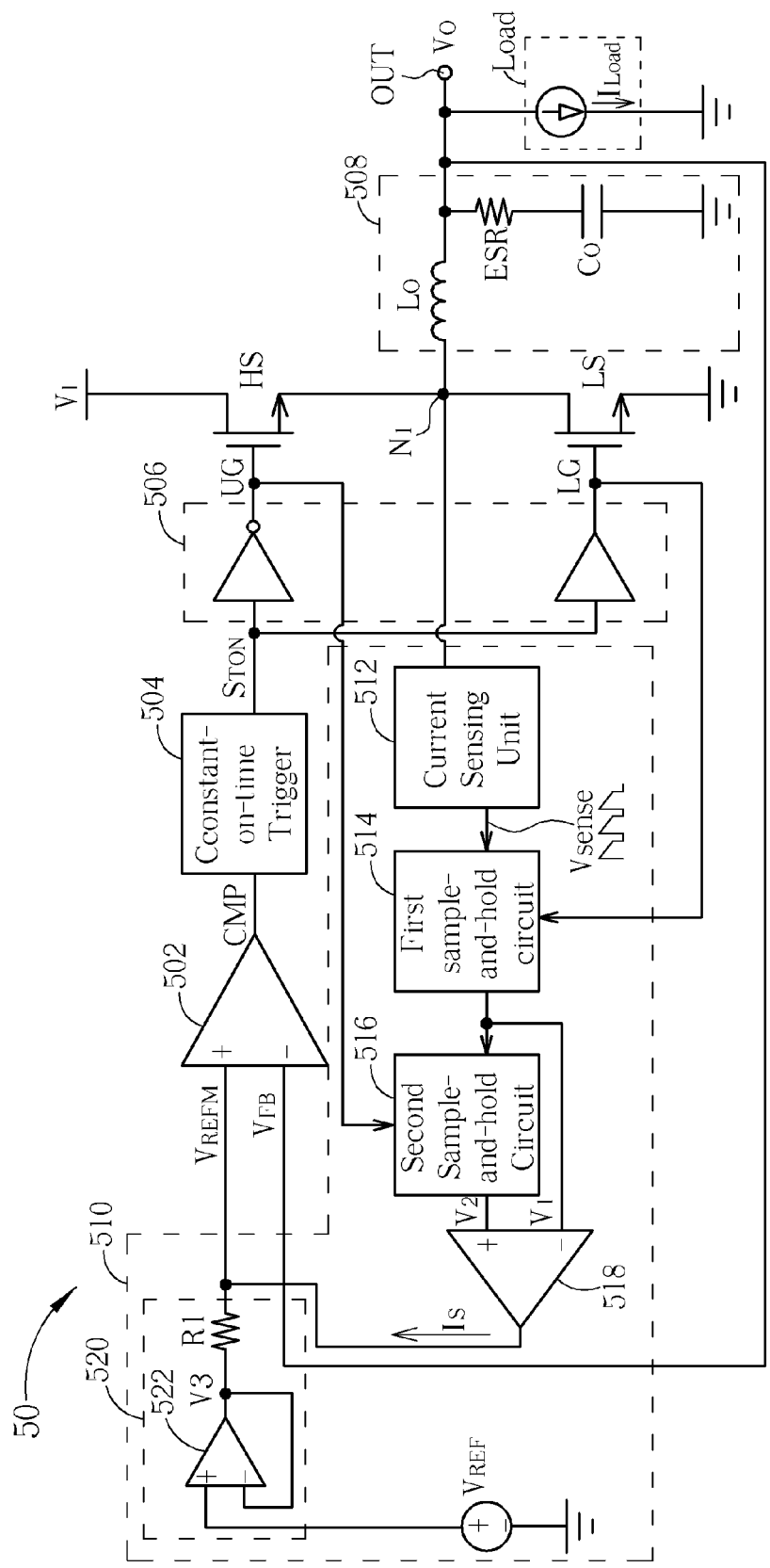
FIG. 5 is a schematic diagram of a buck converter with internal ripple compensation according to a first embodiment of the present invention.

Please refer to FIG. 5, which is a schematic diagram of a buck converter 50 with internal ripple compensation according to a first embodiment of the present invention. The buck converter 50 is utilized for converting an input voltage $V_I$ into a stable output voltage $V_O$ provided to a load Load. The buck converter 50 includes a comparator 502, a constant-on-time trigger 504, a pre-driver 506, a high side switch HS, a low side switch LS, an output module 508, a ripple compensation circuit 510, and a load Load. The comparator 502 includes a positive input terminal, a negative input terminal, and an output terminal, which is utilized for comparing signals received by the positive input terminal and the negative input terminal (i.e. comparing the compensation signal $V_{REFM}$ with the feedback voltage $V_{FB}$ shown in FIG. 5) in order to generate a comparison result CMP. The constant-on-time trigger 504 is coupled to the output terminal of the comparator 502 for generating a trigger control signal $S_{TON}$ according to the comparison result CMP. The pre-driver 506 is coupled to the constant-on-time trigger 504 for generating a first pre-driving signal UG and a second pre-driving signal LG to control the on/off state of the high side switch HS and the low side switch LS according to the trigger control signal $S_{TON}$. As shown on FIG. 5, the pre-driver 506 includes a buffer and an inverter. The high side switch HS and the low side switch LS are coupled between the pre-driver 506 and a first node N1. The output module 508 includes an output inductor $L_O$, an equivalent series resistor ESR, and an output capacitor $C_O$. The interconnections of the units of the output module 508 are as shown in FIG. 5. The ripple compensation circuit 510 is coupled to the high side switch HS, the low side switch LS, the first node N1, and the comparator 502 for generating a compensation signal $V_{REFM}$ outputted to the comparator 502 according to the first pre-driving signal UG, the second pre-driving signal LG, and the current passing through the first node N1. In other words, the buck converter 50 can provide extra ripple by sensing the current passing through the first node N1, i.e. the output inductor current $I_{LO}$, and adding the corresponding ripple to the comparator 502, and the buck converter 50 can also cancel the DC offset of the extra ripple via the ripple compensation circuit 510.

Therefore, the buck converter 50 is capable of sensing the ripple of the inductor current and adding the sensed ripple into the constant on time control loop. Moreover, the buck converter 50 can utilize the ripple compensation circuit 510 to realize DC offset cancellation effectively for enhancing system stability.

The following further elaborates how to control the on-time period $T_{ON}$ and the off-time period $T_{OFF}$ via the constant-on-time trigger 504. The constant-on-time trigger 504 shown in FIG. 5 can adopt a fixed on time trigger scheme or a fixed off time trigger scheme. When the fixed on time trigger scheme is used, the length of the on-time period $T_{ON}$ is a fixed value. Therefore, during the on-time period $T_{ON}$, the high side switch HS is switched to the on state and the low side switch LS is switched to the off state. The electrical energy of input voltage $V_I$ can be applied to the high side switch HS and a path for conducting current can be made through a loop of the high side switch HS, the output inductor $L_O$, and the load Load, therefore the output voltage is generated accordingly. Similarly, during the off-time period $T_{OFF}$, the high side switch HS is switched to the off state and the low side switch LS is switched to the on state, so that a path for conducting current can be made through a loop of the output inductor $L_o$, the load Load, and the ground. Therefore, the continuity of the output inductor current $IL_O$ can be maintained.

In detail, the ripple compensation circuit 510 includes a current sensing unit 512, a first sample-and-hold circuit 514, a second sample-and-hold circuit 516, a first voltage-to-current conversion circuit 518, and a voltage adjusting unit 520. The current sensing unit 512 is coupled to the first node N1 for sensing the current passing through the low side switch LS while the low side switch LS is in an on state (i.e. during the off-time period $T_{OFF}$) and generating a sensing voltage $V_{SENSE}$ accordingly. In such a situation, the sensing current on the first node N1 can be obtained by using the on-state resistor of the low side switch LS to implement current sensing due to the high side switch HS being in the off state, and therefore the sensing current is equal to the current in the output inductor $L_O$ at this time. The first sample-and-hold circuit 514 is coupled to the current sensing unit 512 and the gate of the low side switch LS for sampling and holding the sensing voltage $V_{SENSE}$ to generate a first voltage $V_1$. The second sample-and-hold circuit 516 is coupled to the first sample-and-hold circuit 514 and the gate of the high side switch HS for sampling and holding the first voltage $V_1$ to generate a second voltage $V_2$.

The first voltage-to-current conversion circuit 518 includes a positive input terminal coupled to the second sample-and-hold circuit 516, a negative input terminal coupled to the first sample-and-hold circuit 514, and an output terminal coupled to the positive input terminal of the comparator 502, which is utilized for generating a compensation current $I_S$ according to the first voltage $V_1$ and the second voltage $V_2$. Preferably, the first voltage-to-current conversion circuit 518 can be an operational transconductance amplifier capable of amplifying the difference of voltages of both input terminals and generating the compensation current $I_S$ accordingly. The voltage adjusting unit 520 is coupled to the output terminal of the first voltage-to-current conversion circuit 518 and the positive input terminal of the comparator 502 for generating the compensation signal $V_{REFM}$ outputted to the comparator 502 according to a reference voltage $V_{REF}$ and the compensation current $I_S$. The voltage adjusting unit 520 includes a unity gain buffer 522 and a first adjusting resistor R1. The unity gain buffer 522 includes a positive input terminal for receiving the reference voltage $V_{REF}$, a negative input terminal, and an output terminal coupled to the negative input terminal for outputting a third voltage $V_3$. In such a situation, the reference voltage $V_{REF}$ is equal to the third voltage $V_3$. In addition, the first adjusting resistor R1 is coupled to the output terminal of the unity gain buffer 522 and the positive input terminal of the comparator 502 for generating the compensation signal $V_{REFM}$ to the positive input terminal of the comparator 502 according to the third voltage $V_3$ and the compensation current $I_S$. As a result, the voltage adjusting unit 520 is able to add the compensation current $I_S$ with extra ripple component to the constant on time trigger control loop via the first adjusting resistor R1.

Figure 6:
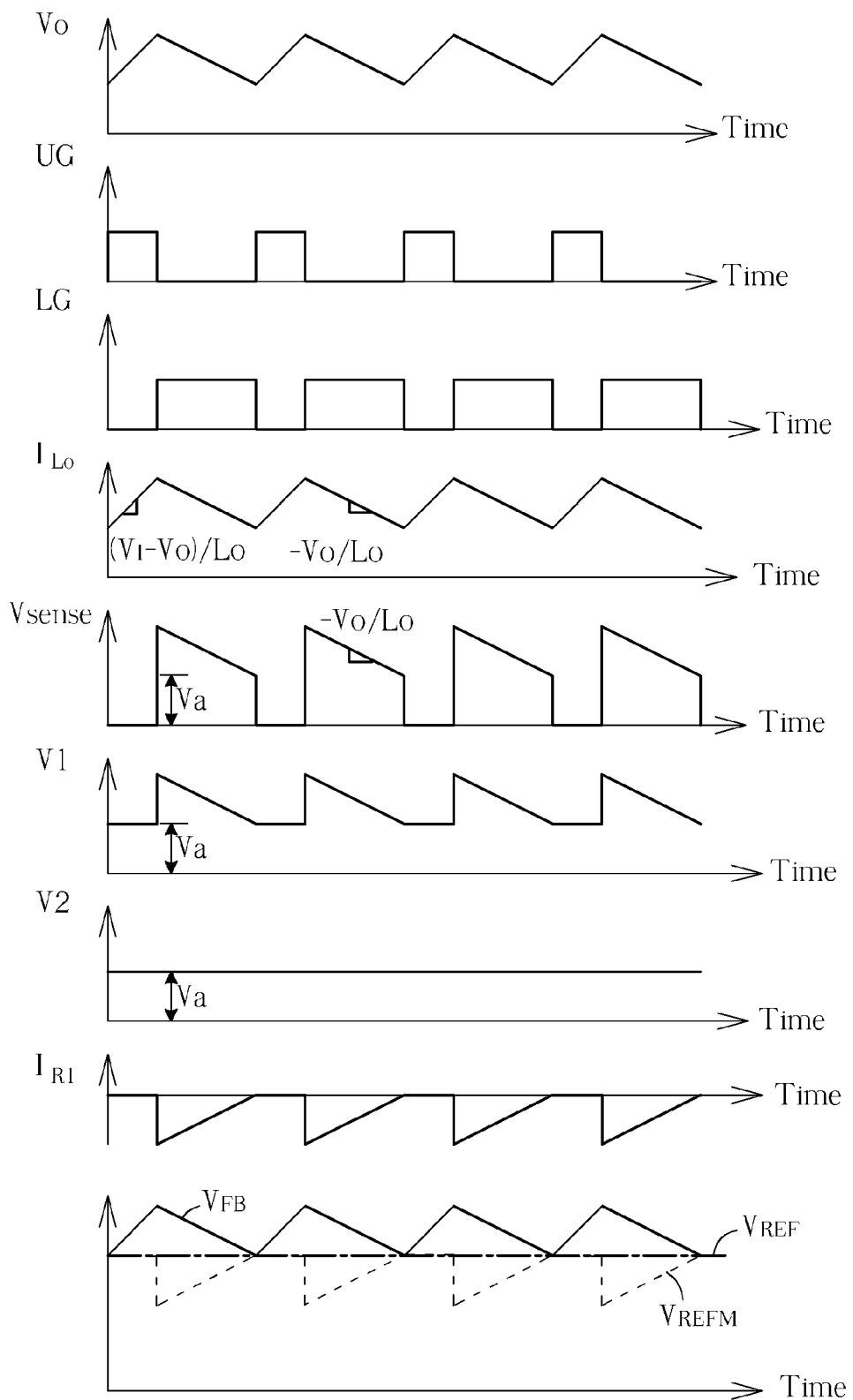
FIG. 6 is a schematic diagram of signal waveforms of the buck converter shown in FIG. 5 according to an embodiment of the present invention.

FIG. 6 is a schematic diagram of signal waveforms of the buck converter 50 shown in FIG. 5 according to an embodiment of the present invention. During the off-time period $T_{OFF}$ (the low side switch LS is in the on state), the buck converter 50 can utilize the current sensing unit 510 to sense the current passing through the first node N1 and transform the sensed current to the corresponding sensing voltage $V_{SENSE}$. The sensing voltage $V_{SENSE}$ sensed by the current sensing unit 510 corresponds to the ripple voltage in the output inductor $L_O$. As shown in FIG. 6, the sensing voltage $V_{SENSE}$ contains an offset voltage Va. Furthermore, the first sample-and-hold circuit 514 samples the sensing voltage $V_{SENSE}$ when the low side switch LS is in an on state, i.e. during the off-time period $T_{OFF}$, and holds the sensing voltage $V_{SENSE}$ at a specific voltage level (which is the voltage level of the sensing voltage $V_{SENSE}$ at the end of the previous off-time period $T_{OFF}$) when the low side switch LS is in an off state, i.e. during the on-time period $T_{ON}$, for generating the first voltage $V_1$. Besides, the second sample-and-hold circuit 516 samples the first voltage $V_1$ when the high side switch HS is in an on state, i.e. during the on-time period $T_{ON}$, and holds the first voltage $V_1$ at a specific voltage level (which is the voltage level of the first voltage $V_1$ at the end of the previous on-time period $T_{ON}$) when the high side switch HS is in an off state, i.e. during the off-time period $T_{OFF}$, for generating the second voltage $V_2$. After that, the first voltage-to-current conversion circuit 518 produces the compensation current $I_S$ according to the difference of the first voltage $V_1$ and the second voltage $V_2$. Finally, through the first adjusting resistor R1, the compensation current $I_S$ with extra ripple voltage component can be incorporated into the constant on time trigger control loop for providing an extra ripple. As a result, the buck converter 50 can be applied to a low equivalent series resistance (low ESR) system, such as a converter system using MLCC for realizing the output capacitor Co, for reducing the sub-harmonic oscillation problem. Referring to the waveform of the sensing voltage $V_{SENSE}$ and the compensation signal $V_{REFM}$ shown in FIG. 6, the offset voltage Va including in the sensing voltage $V_{SENSE}$ has been cancelled by the following elements.

Figure 7:
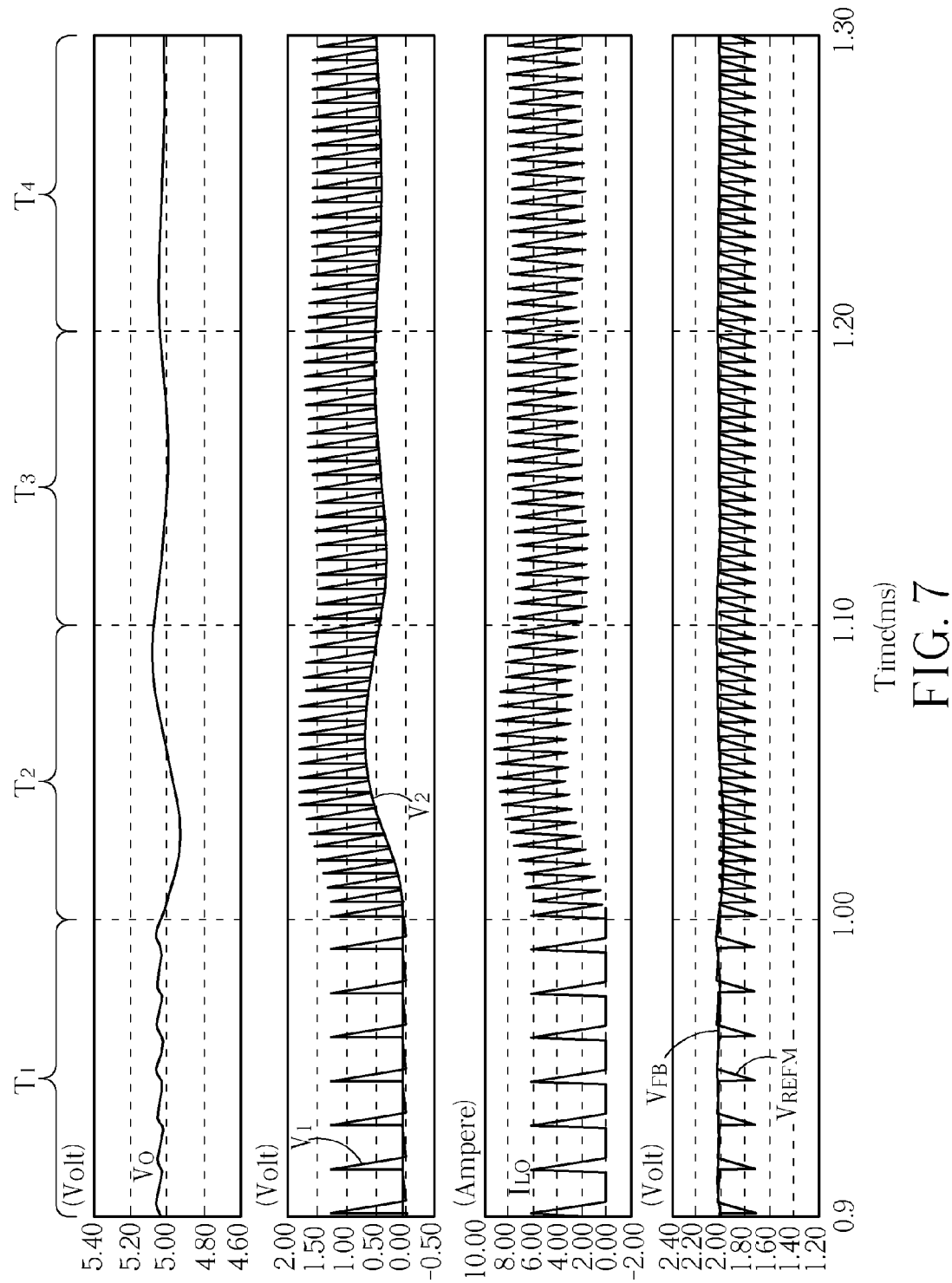
FIG. 7 is a simulation result of the buck converter shown in FIG. 5 according to an embodiment of the present invention.

Furthermore, please refer to FIG. 7. FIG. 7 is a simulation result of the buck converter 50 shown in FIG. 5 according to an embodiment of the present invention, which is operated with a very small equivalent series resistor ESR (0.05 milliohms). The buck converter 50 is in light load state during the period T1 and is in heavy load state during the periods T2 to T4. As shown in FIG. 7, regarding transition response of the buck converter 50 when the load instantaneous transient occurs, the output voltage $V_O$ of the buck converter 50 only has a slight oscillation after entering the period T2. Moreover, the output voltage $V_O$ of the buck converter 50 stays at a stable voltage level (about 5 volts) after the period T4. Therefore, the DC offset problem will not occur in the buck converter 50.

Figure 8:
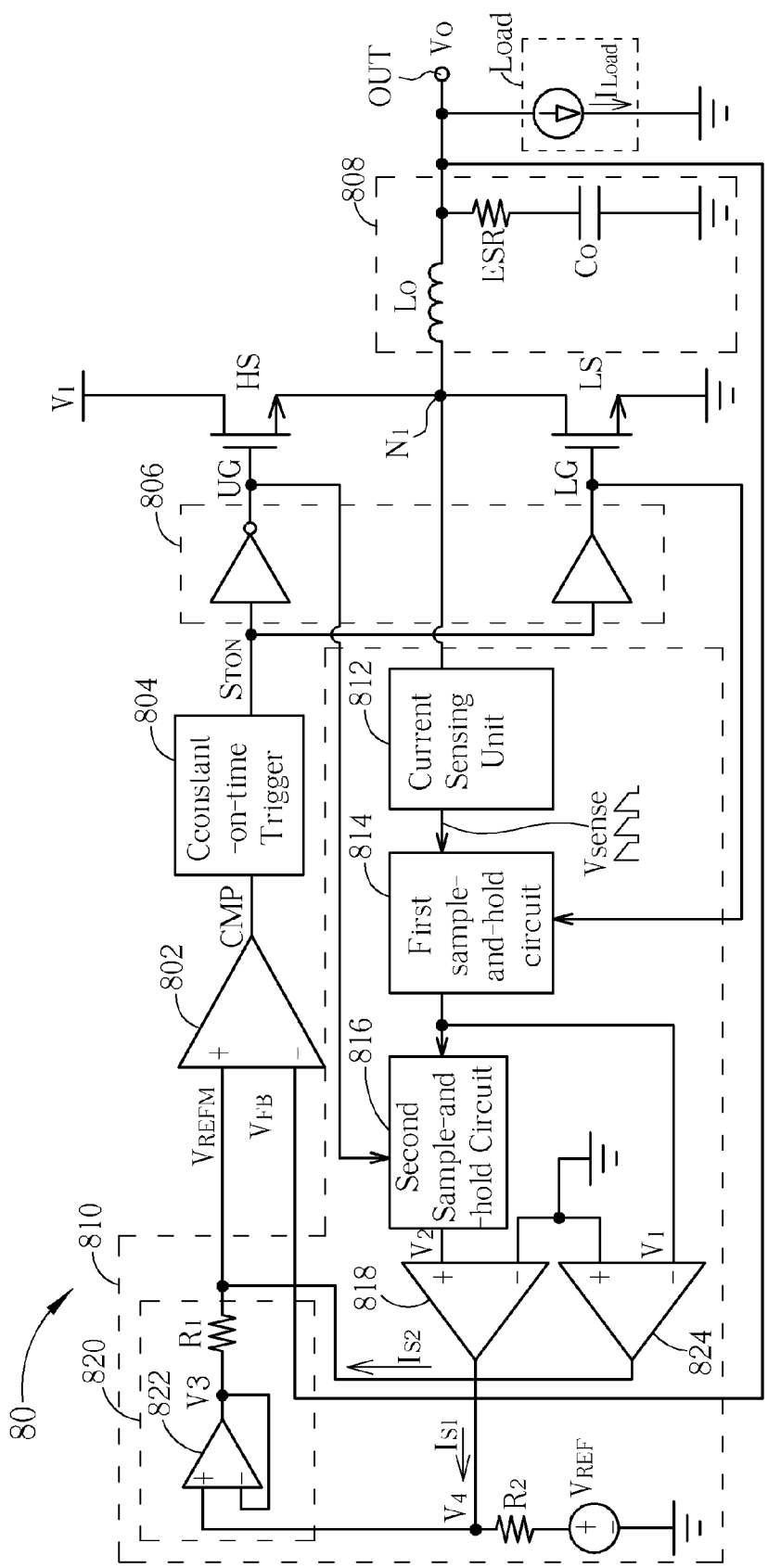
FIG. 8 is a schematic diagram of a buck converter with internal ripple compensation according to a second embodiment of the present invention.
Figure 9:
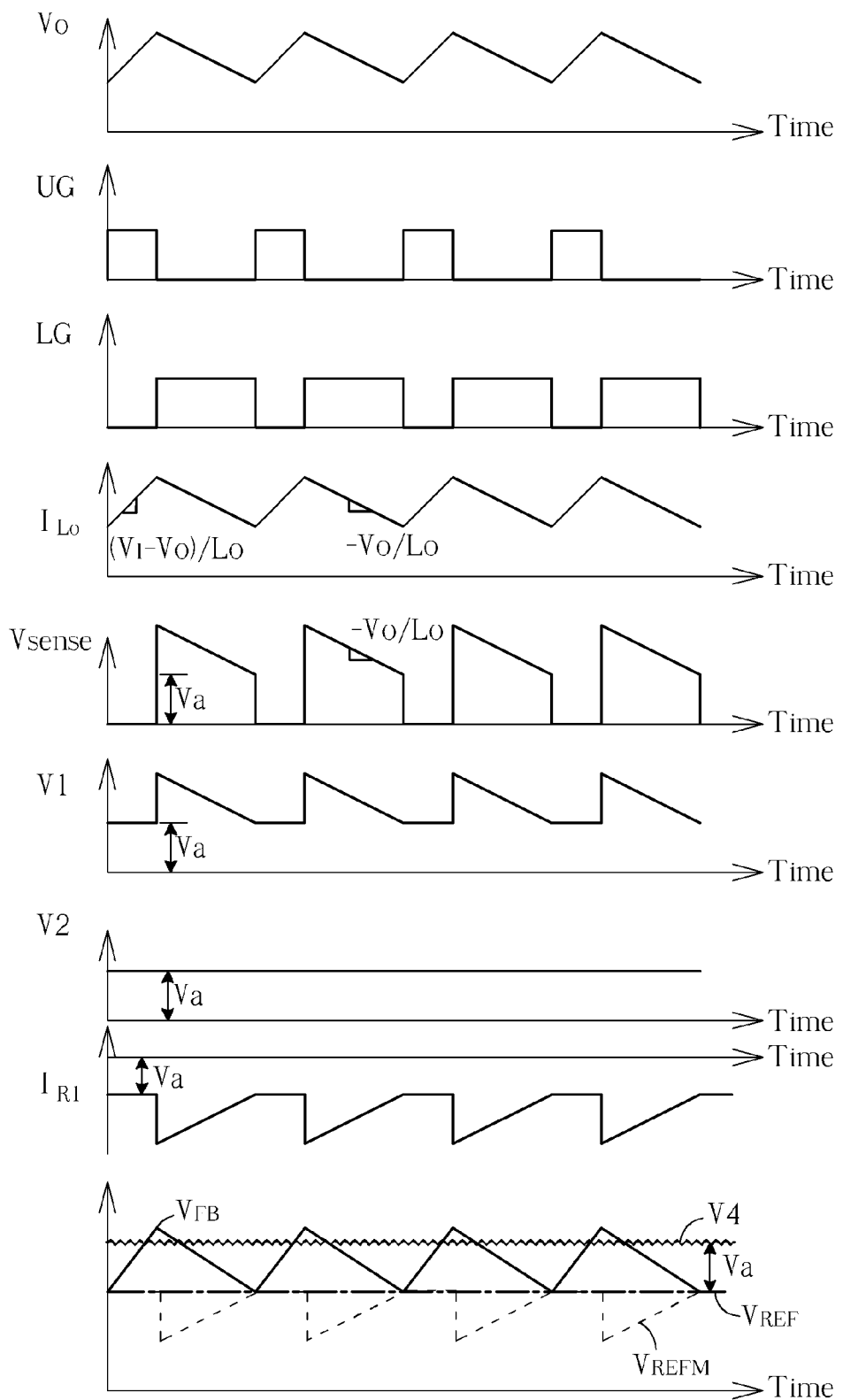
FIG. 9 is a schematic diagram of signal waveforms of the buck converter shown in FIG. 8 according to an embodiment of the present invention.
Figure 10:
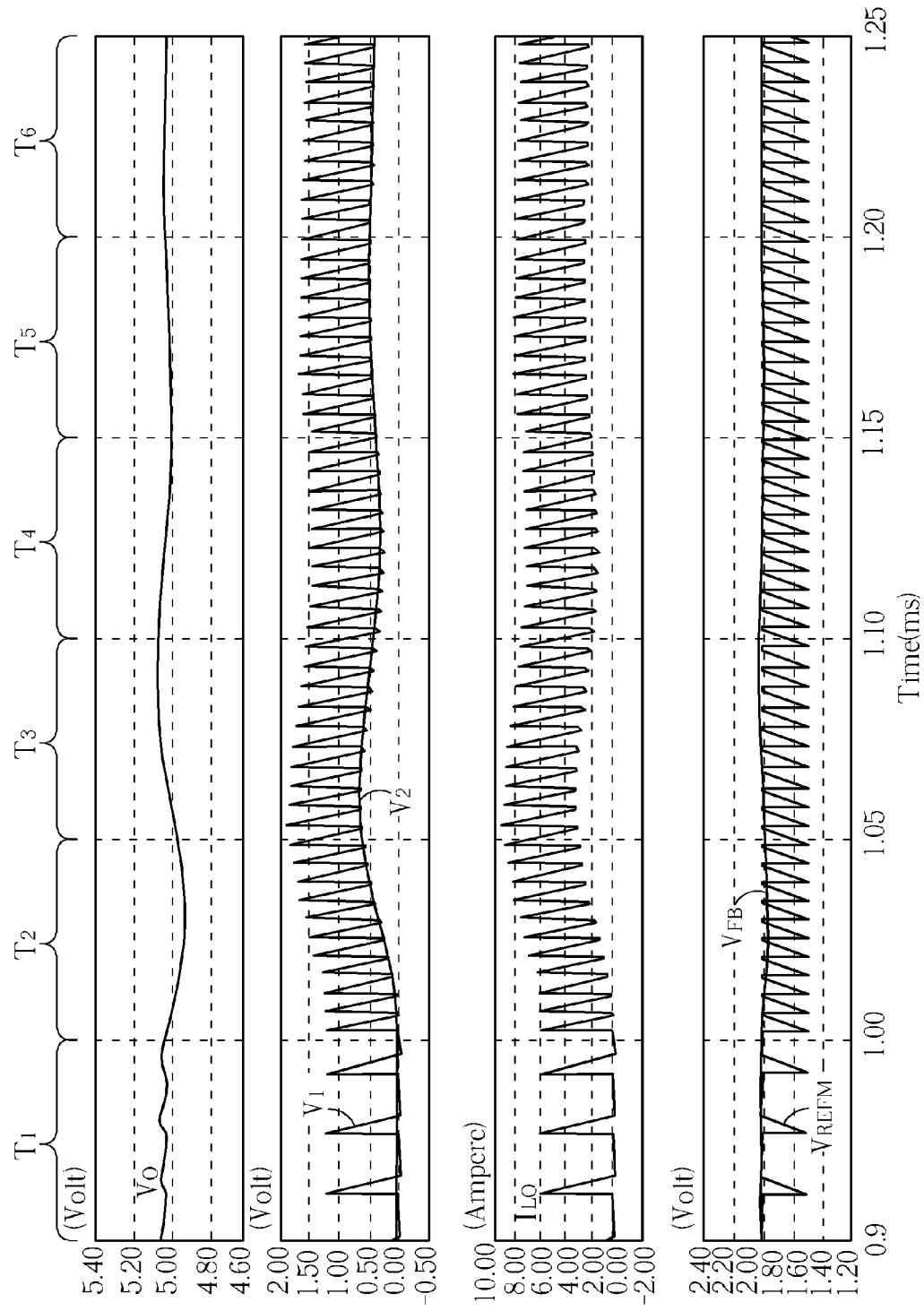
FIG. 10 is a simulation result of the buck converter shown in FIG. 8 according to an embodiment of the present invention.

Please refer to FIG. 8 and FIG. 9. FIG. 8 is a schematic diagram of a buck converter 80 with internal ripple compensation according to a second embodiment of the present invention. FIG. 9 is a schematic diagram of signal waveforms of the buck converter 80 shown in FIG. 8 according to an embodiment of the present invention. Please note that the units in the buck converter 80 shown in FIG. 8 with the same designations as those in the buck converter 50 shown in FIG. 5 have similar operations and functions, and further description thereof is omitted for brevity. The interconnections of the units areas shown in FIG. 8. The buck converter 80 includes a comparator 802, a constant-on-time trigger 804, a pre-driver 806, a high side switch HS, a low side switch LS, an output module 808, a ripple compensation circuit 810, and a load Load. The ripple compensation circuit 810 includes a current sensing unit 812, a first sample-and-hold circuit 814, a second sample-and-hold circuit 816, a first voltage-to-current conversion circuit 818, a voltage adjusting unit 820, a second voltage-to-current conversion circuit 824, and a second adjusting resistor R2. Compared with the buck converter 50, the buck converter 80 can eliminate DC offset existing in the sensing voltage $V_{SENSE}$ via operation of the first voltage-to-current conversion circuit 818, the second voltage-to-current conversion circuit 824, the voltage adjusting unit 820, and the second adjusting resistor R2. Please refer to FIG. 10. FIG. 10 is a simulation result of the buck converter 80 shown in FIG. 8 according to an embodiment of the present invention, which is operated with a very small equivalent series resistor ESR (0.05 milliohms). The buck converter 80 is in light load state during the period T1 and is in heavy load state during the periods T2 to T6. As shown in FIG. 10, regarding the transition response of the buck converter 80 when the load instantaneous transient occurs, the output voltage $V_O$ of the buck converter 80 also has a slight oscillation after entering the period T2. Moreover, the output voltage $V_O$ of the buck converter 80 stays at a stable voltage level (about 5 volts) after the period T4. As can been seen, the DC offset problem has been resolved in the buck converter 80.

Figure 11:
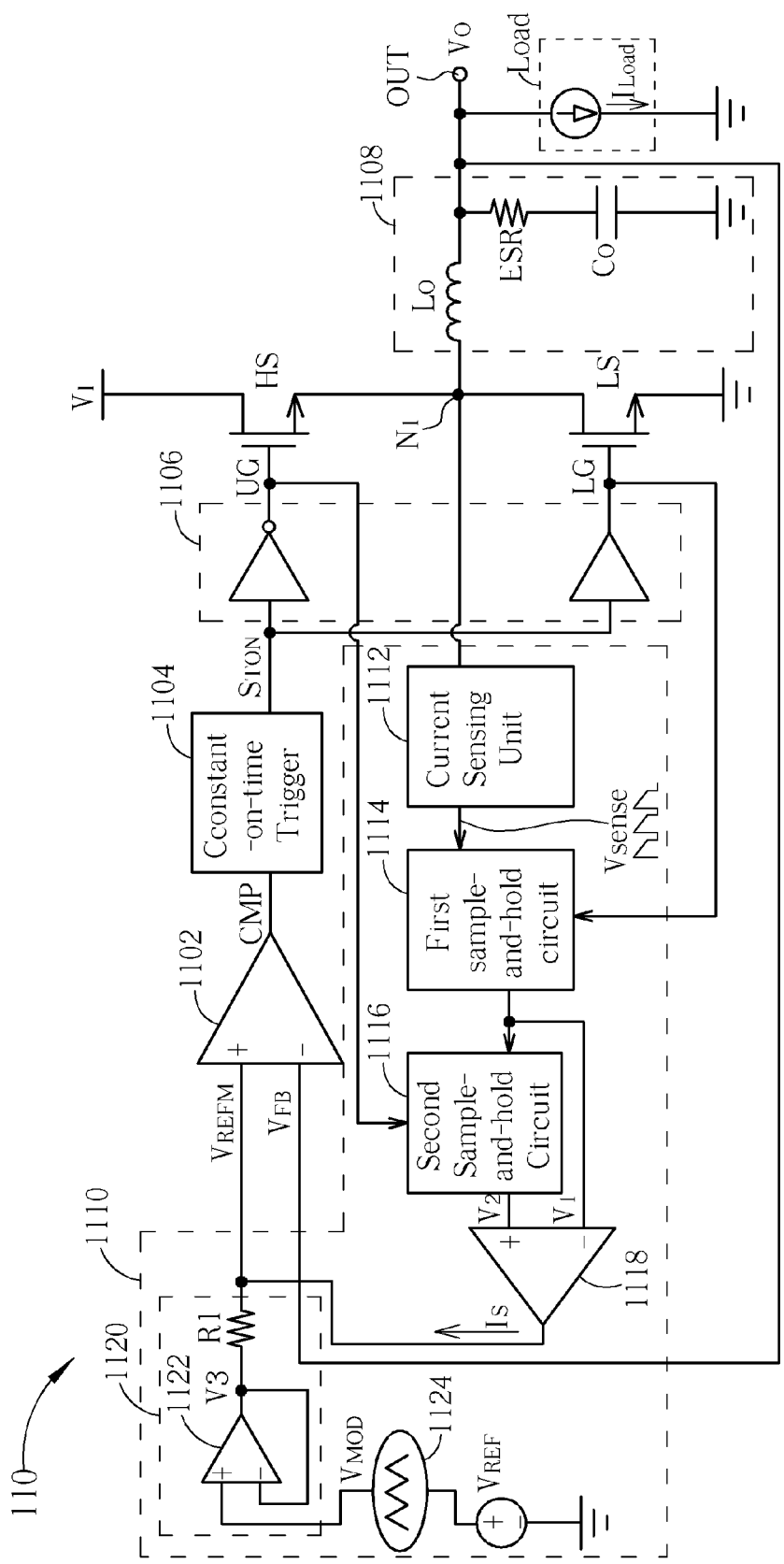
FIG. 11 is a schematic diagram of a buck converter with internal ripple compensation according to a third embodiment of the present invention.
Figure 12:
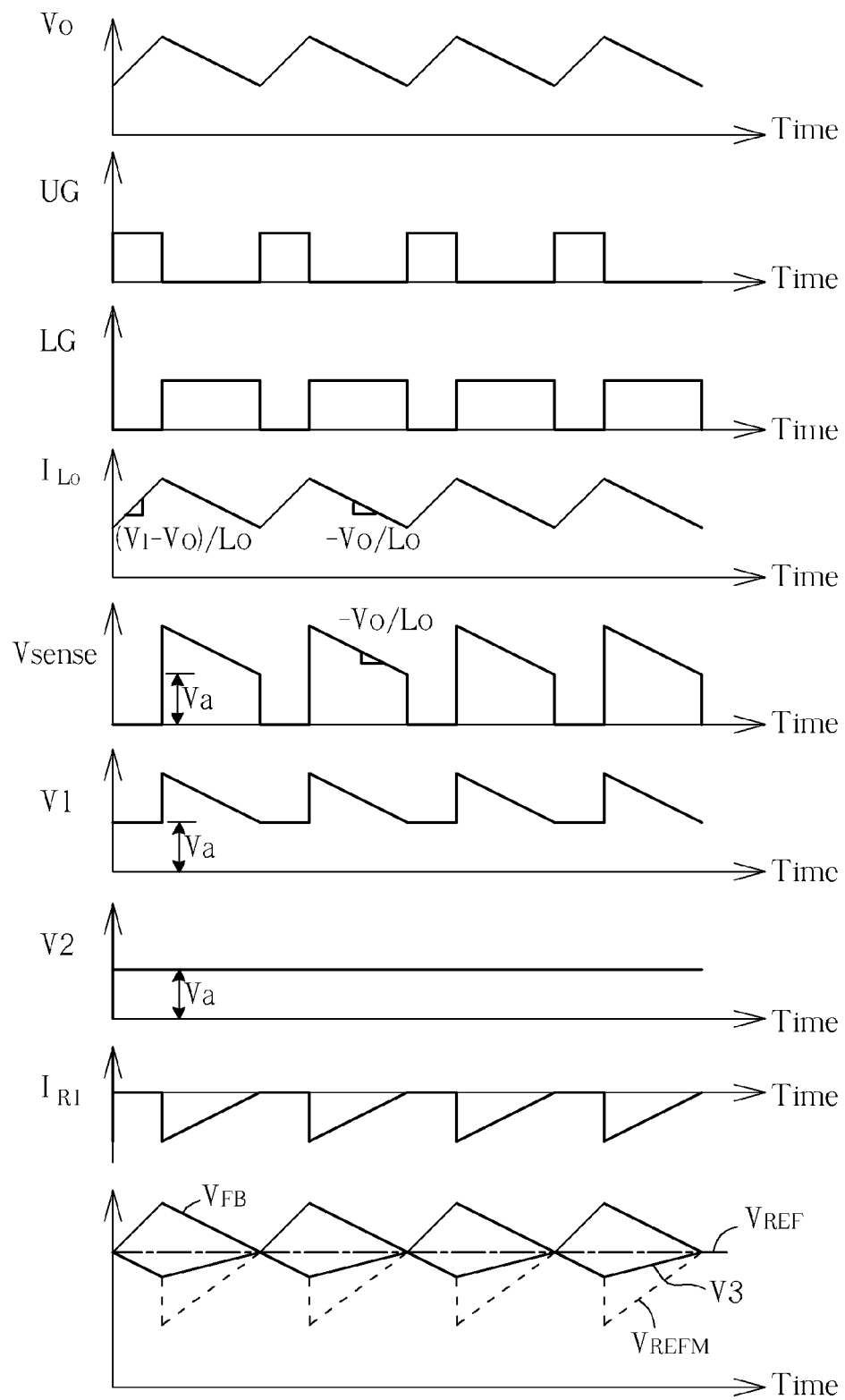
FIG. 12 is a schematic diagram of signal waveforms of the buck converter shown in FIG. 11 according to an embodiment of the present invention.
Figure 14:
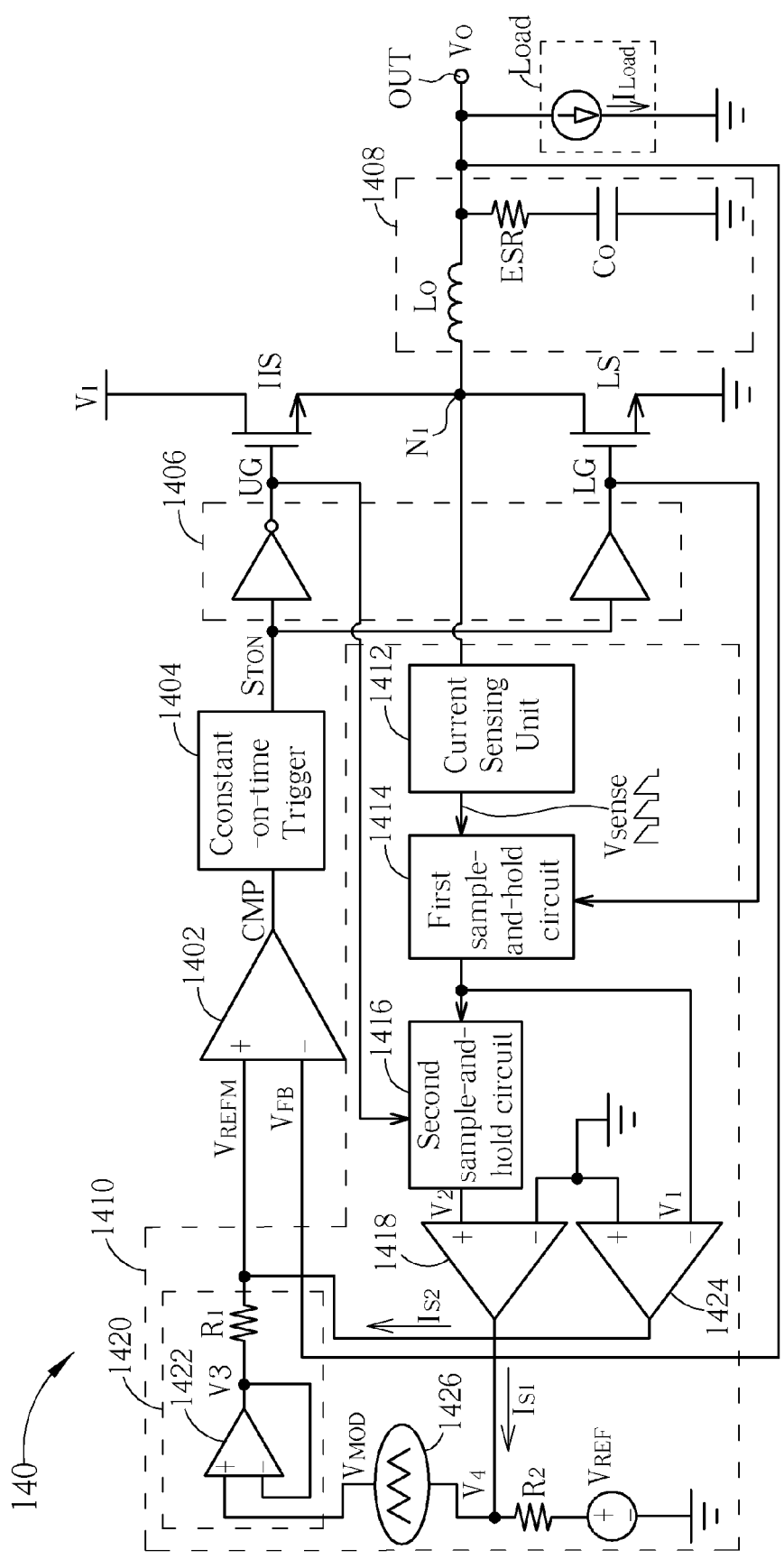
FIG. 14 is a schematic diagram of a buck converter with internal ripple compensation according to a fourth embodiment of the present invention.
Figure 15:
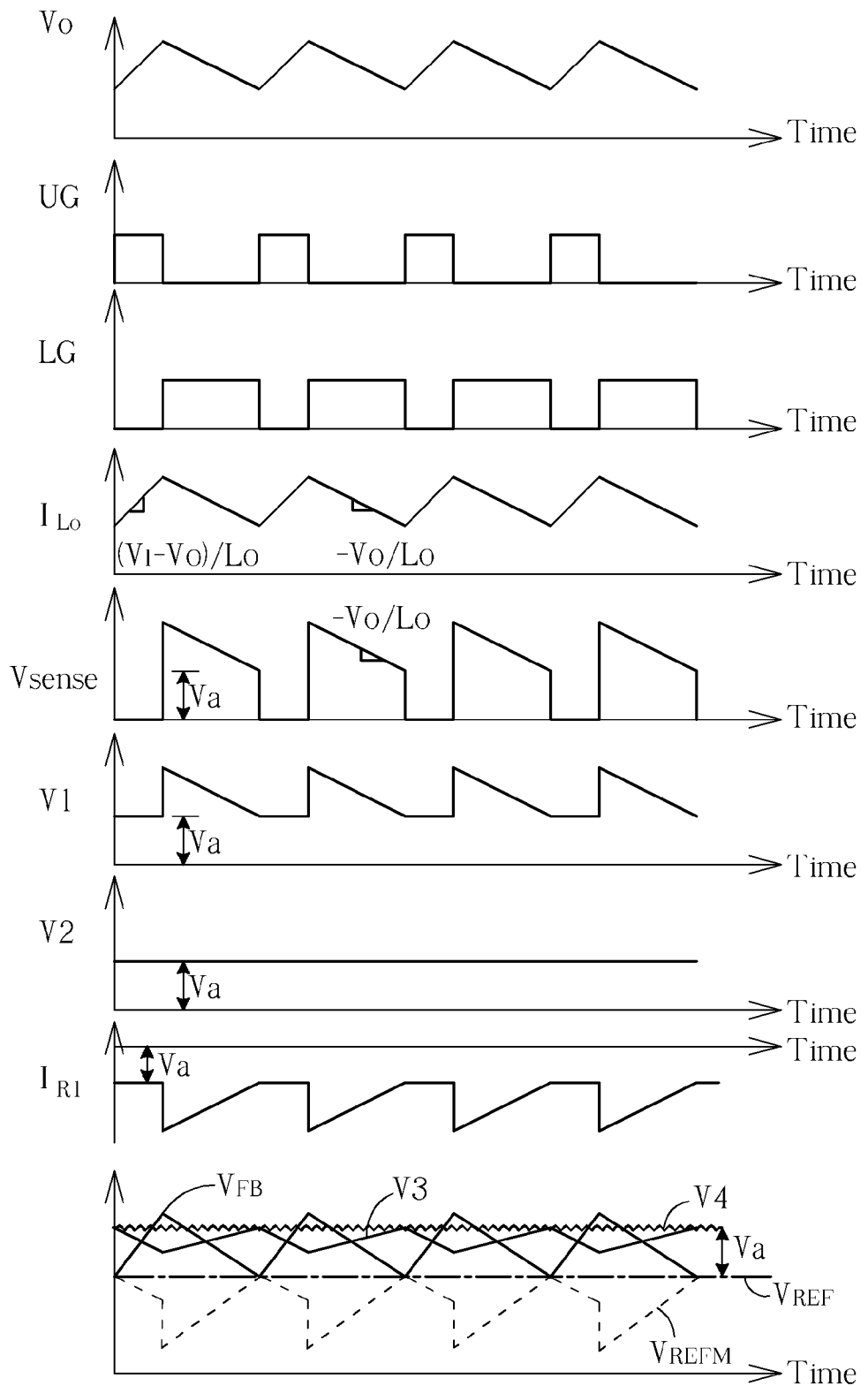
FIG. 15 is a schematic diagram of signal waveforms of the buck converter shown in FIG. 14 according to an embodiment of the present invention.

On the other hand, for improving the transient response time during the load instantaneous transient, please refer to FIG. 11 and FIG. 14. FIG. 11 is a schematic diagram of a buck converter 110 with internal ripple compensation according to a third embodiment of the present invention. FIG. 14 is a schematic diagram of a buck converter 140 with internal ripple compensation according to a fourth embodiment of the present invention. Please note that the units in the buck converter 110 shown in FIG. 11 and the buck converter 140 shown in FIG. 14 with the same designations as those in the buck converter 50 shown in FIG. 5 and the buck converter 80 shown in FIG. 8, respectively, have similar operations and functions, and further description thereof is omitted for brevity. The interconnections of the units are as shown in FIG. 11 and FIG. 14. In FIG. 11, the buck converter 110 includes a comparator 1102, a constant-on-time trigger 1104, a pre-driver 1106, a high side switch HS, a low side switch LS, an output module 1108, a ripple compensation circuit 1110, and a load Load. Different from the buck converter 50 shown in FIG. 5, the buck converter 110 further includes a ripple generator 1124 coupled to the voltage adjusting unit 1120 for generating a modulated reference voltage $V_{MOD}$ according to the reference voltage $V_{REF}$ for providing extra ripple voltage. In FIG. 14, the buck converter 140 includes a comparator 1402, a constant-on-time trigger 1404, a pre-driver 1406, a high side switch HS, a low side switch LS, an output module 1408, a ripple compensation circuit 1410, and a load Load. Compared with the buck converter 80 shown in FIG. 8, the buck converter 140 further includes a ripple generator 1426 coupled between the voltage adjusting unit 1420 and the second adjusting resistor R2 for generating a modulated reference voltage $V_{MOD}$ according to the fourth voltage $V_4$ for providing an extra ripple voltage. FIG. 12 and FIG. 15 are schematic diagrams of signal waveforms of the buck converters 110 shown in FIG. 11 and the buck converters 140 shown in FIG. 14 respectively according to embodiments of the present invention.

Figure 13:
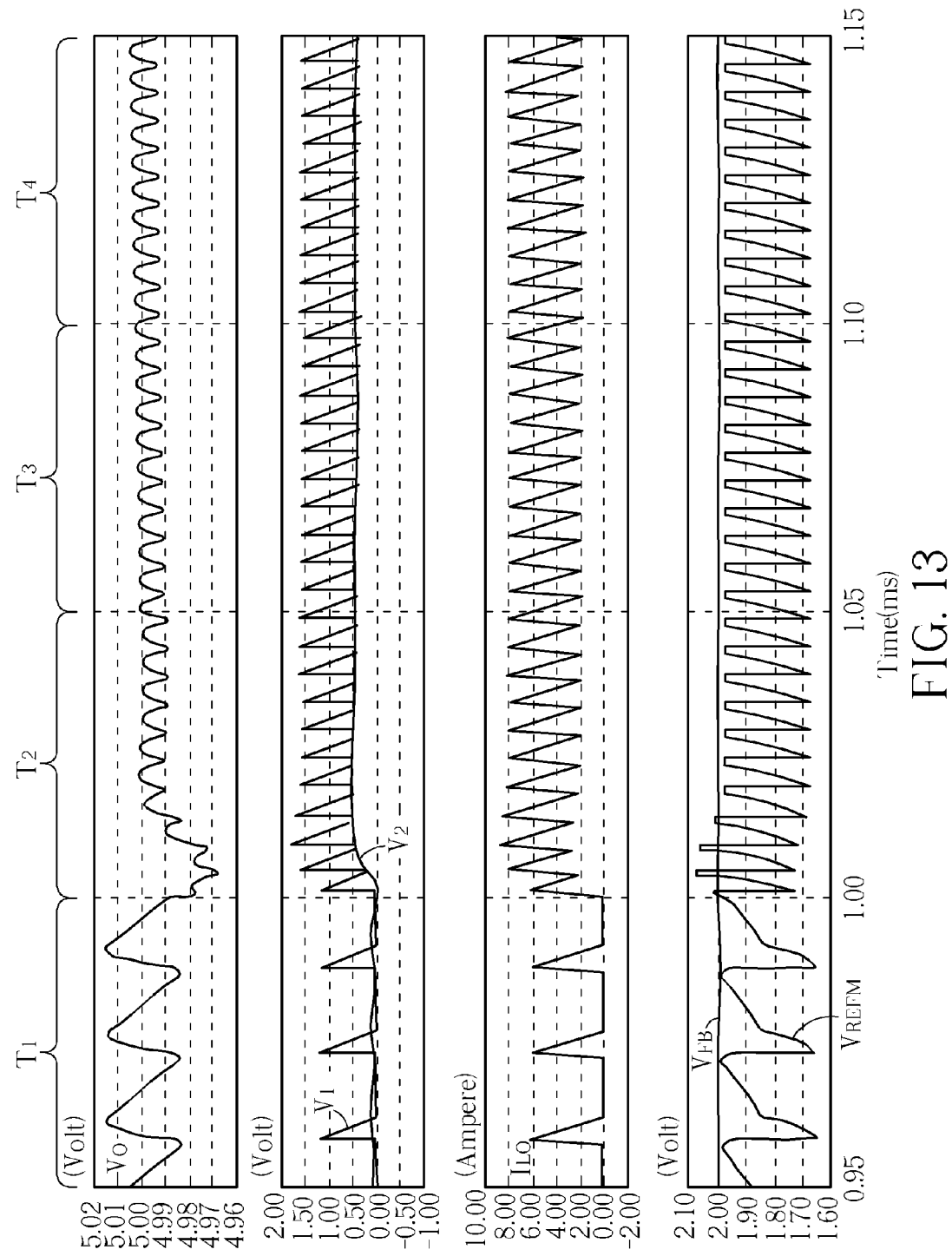
FIG. 13 is a simulation result of the buck converter shown in FIG. 11 according to an embodiment of the present invention.
Figure 16:
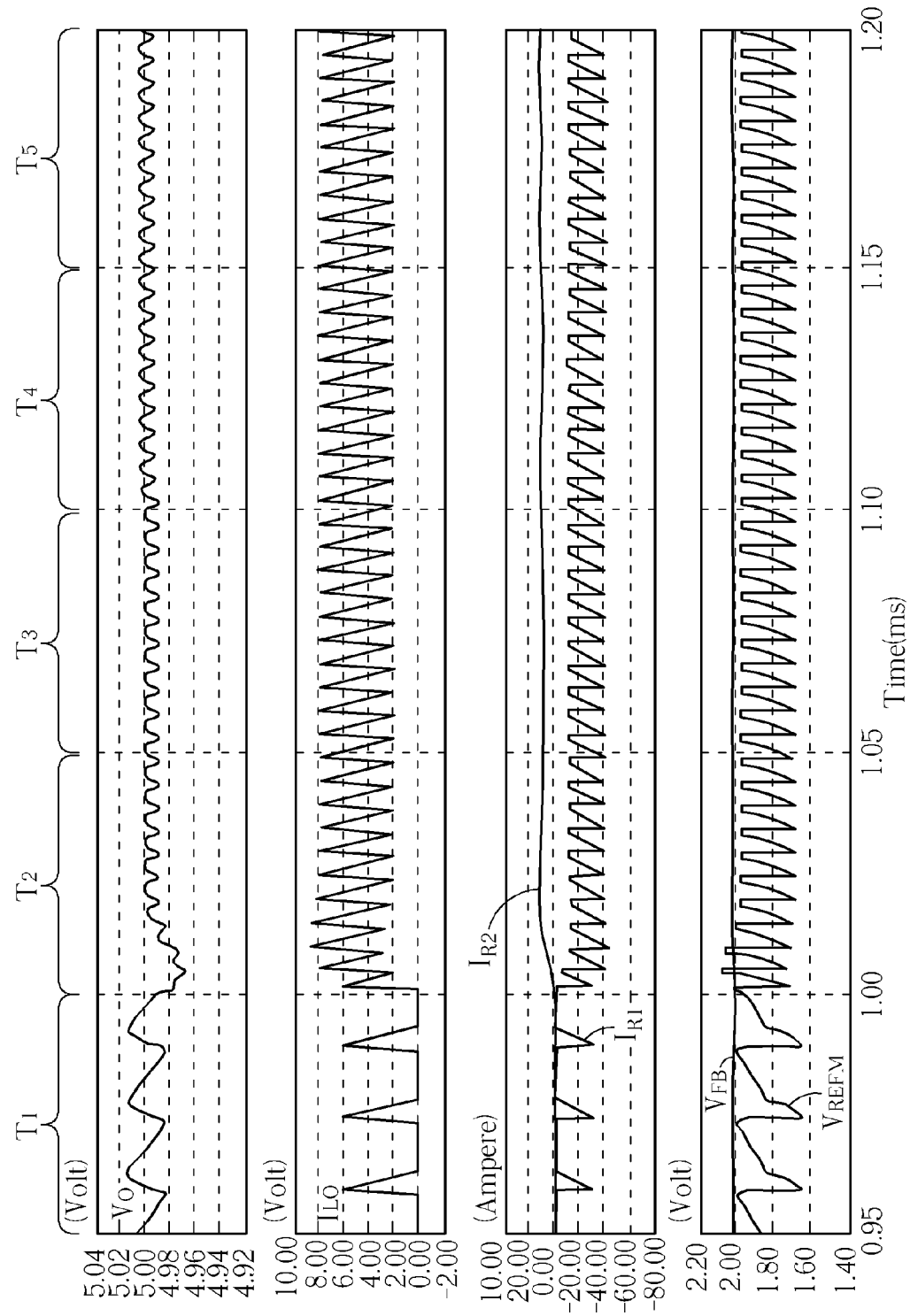
FIG. 16 is a simulation result of the buck converter shown in FIG. 14 according to an embodiment of the present invention

Furthermore, please refer to FIG. 13 and FIG. 16. FIG. 13 is a simulation result of the buck converter 110 shown in FIG. 11 according to an embodiment of the present invention, which is operated with a very small equivalent series resistor ESR (0.05 milliohms). The buck converter 110 is in light load state during the period T1 and is in heavy load state during the periods T2 to T4. Further description associated with the transition response of the buck converter 110 during the load instantaneous transient is provided as follows. When the buck converter 110 transits from a light load state (during the period T1) into a heavy load state (after the period T1), the inductor current $I_{LO}$ of the output inductor $L_O$ changes from 1 ampere to 5 amperes. In such a situation, the output voltage $V_O$ of the buck converter 110 only has a slight oscillation after entering the period T2 and rapidly enters and maintains a stable voltage level (about 5 volts) after the middle of period T2. Therefore, compared with the buck converter 50 shown in FIG. 5, the buck converter 110 has a much shorter transition response time. Moreover, FIG. 16 is a simulation result of the buck converter 140 shown in FIG. 14 according to an embodiment of the present invention, which is operated with a very small equivalent series resistor ESR (0.05 milliohms). After transitioning from a light load state (during the period T1) to a heavy load state (after the period T1), the buck converter 140 rapidly enters and maintains a stable voltage level (about 5 volts) after the middle of period T2. In brief, the buck converter 110 and the buck converter 140 having the ripple generator can reduce the transition response time during the load instantaneous transient effectively.

In summary, compared with the prior art, the present invention is capable of sensing the ripple of the inductor current and adding the sensed ripple into the constant on time control loop to enhance the system stability. Moreover, the present invention can utilize the ripple compensation circuit to realize DC offset cancellation effectively for improving system stability. In addition, the present invention can further provide an extra ripple via the ripple generator for improving the transition response time during the load instantaneous transient effectively.

Those skilled in the art will readily observe that numerous modifications and alterations of the device and method may be made while retaining the teachings of the invention.

What is claimed is:

1. A buck converter with internal ripple compensation, comprising:
    a comparator, comprising a first input terminal, a second input terminal, and an output terminal, for comparing signals received by the first input terminal and the second input terminal to generate a comparison result;
    a constant-on-time trigger, coupled to the output terminal of the comparator, for generating a trigger control signal according to the comparison result;
    a pre-driver, coupled to the constant-on-time trigger, for generating a first pre-driving signal and a second pre-driving signal according to the trigger control signal;
    a high side switch, coupled to the pre-driver and a first node;
    a low side switch, coupled to the pre-driver and the first node;
    an output module, coupled between the first node and a signal output end; and
    a ripple compensation circuit, coupled to the high side switch, the low side switch, the first node, and the comparator for generating a compensation signal outputted to the comparator; wherein the ripple compensation circuit comprises:
        a current sensing unit, coupled to the first node, for sensing a current passing through the low side switch while the low side switch is in an on state and generating a sensing voltage accordingly;

a first sample-and-hold circuit, coupled to the current sensing unit and a first terminal of the low side switch, for sampling and holding the sensing voltage detected by the current sensing unit to generate a first voltage;

a second sample-and-hold circuit, coupled to the first sample-and-hold circuit and a first terminal of the high side switch, for sampling and holding the first voltage to generate a second voltage;

a first voltage-to-current conversion circuit, comprising a first input terminal coupled to the second sample-and-hold circuit, a second input terminal coupled to the first sample-and-hold circuit, and an output terminal coupled to the first input terminal of the comparator, for generating a compensation current according to the first voltage and the second voltage; and a voltage adjusting unit, coupled to the output terminal of the first voltage-to-current conversion circuit and the first input terminal of the comparator, for generating the compensation signal outputted to the comparator according to a reference voltage and the compensation current.

2. The buck converter of claim 1, wherein the first input terminal of the comparator is coupled to the ripple compensation circuit, the second input terminal of the comparator is coupled to the signal output end, the output terminal of the comparator is coupled to the constant-on-time trigger, and the comparison result is outputted via the output terminal of the comparator.

3. The buck converter of claim 1, wherein the high side switch is a semiconductor transistor, comprising a first terminal coupled to the pre-driver for receiving the first pre-driving signal, a second terminal coupled to a first power end, and a third terminal coupled to the first node, for controlling an electrical connection between the second terminal of the high side switch and the third terminal end of high side switch according to the first pre-driving signal.

4. The buck converter of claim 1, wherein the low side switch is a semiconductor transistor, comprising a first terminal coupled to the pre-driver for receiving the second pre-driving signal, a second terminal coupled to the first node, and a third terminal coupled to a ground end, for controlling an electrical connection between the second terminal of the low side switch and the third terminal end of the low side switch according to the second pre-driving signal.

5. The buck converter of claim 1, wherein the output module comprises:
an output inductor, coupled between the first node and the signal output end;
an equivalent series resistor, coupled to the signal output end; and
an output capacitor, coupled between the equivalent series resistor and a ground end.

6. The buck converter of claim 1, wherein the first sample-and-hold circuit samples the sensing voltage while the low side switch is in an on state and holds at a first holding voltage while the low side switch is in an off state to generate the first voltage.

7. The buck converter of claim 1, wherein the second sample-and-hold circuit samples the first voltage while the high side switch is in an on state and holds at a second holding voltage while the high side switch is in an off state to generate the second voltage.

8. The buck converter of claim 1, wherein the first voltage-to-current conversion circuit is an operational transconductance amplifier and generates the compensation current according to the difference of the first voltage and the second voltage.

9. The buck converter of claim 1, wherein the voltage adjusting unit comprises:
a unity gain buffer, comprising a positive input terminal coupled to a reference voltage generator, for receiving the reference voltage, a negative input terminal, and an output terminal coupled to the negative input terminal, for generating a third voltage; and
a first adjusting resistor, coupled to the output terminal of the unity gain buffer and the first input terminal of the comparator, for generating the compensation signal outputted to the first input terminal of the comparator according to the third voltage and the compensation current.

10. A buck converter with internal ripple compensation, comprising:
a comparator, comprising a first input terminal, a second input terminal, and an output terminal, for comparing signals received by the first input terminal and the second input terminal to generate a comparison result;
a constant-on-time trigger, coupled to the output terminal of the comparator, for generating a trigger control signal according to the comparison result;
a pre-driver, coupled to the constant-on-time trigger, for generating a first pre-driving signal and a second pre-driving signal according to the trigger control signal;
a high side switch, coupled to the pre-driver and a first node;
a low side switch, coupled to the pre-driver and the first node;
an output module, coupled between the first node and a signal output end; and
a ripple compensation circuit, coupled to the high side switch, the low side switch, the first node, and the comparator for generating a compensation signal outputted to the comparator; wherein the ripple compensation circuit comprises:
a current sensing unit, coupled to the first node, for sensing a current passing through the low side switch while the low side switch is in an on state and generating a sensing voltage accordingly;
a first sample-and-hold circuit, coupled to the current sensing unit and a first terminal of the low side switch, for sampling and holding the sensing voltage detected by the current sensing unit to generate a first voltage;
a second sample-and-hold circuit, coupled to the first sample-and-hold circuit and a first terminal of the high side switch, for sampling and holding the first voltage to generate a second voltage;
a first voltage-to-current conversion circuit, comprising a first input terminal coupled to the second sample-and-hold circuit, a second input terminal coupled to a ground end, and an output terminal, for generating a first compensation current according to the second voltage;
a second voltage-to-current conversion circuit, comprising a first input terminal coupled to the ground end, a second input terminal coupled to the first sample-and-hold circuit, and an output terminal coupled to the first input terminal of the comparator, for generating a second compensation current according to the first voltage;
a voltage adjusting unit, coupled to the output terminal of the first voltage-to-current conversion circuit, the output terminal of the second voltage-to-current conversion circuit, and the first input terminal of the comparator, for generating the compensation signal outputted to the comparator according to a fourth voltage and the second compensation current; and a second adjusting resistor, coupled to the output terminal of the first voltage-to-current circuit and the voltage adjusting unit, for generating the fourth voltage according to a reference voltage and the first compensation current.

11. The buck converter of claim 10, wherein the first sample-and-hold circuit samples the sensing voltage while the low side switch is in an on state and holds at a first holding voltage while the low side switch is in an off state to generate the first voltage.

12. The buck converter of claim 10, wherein the second sample-and-hold circuit samples the first voltage while the high side switch is in an on state and holds at a second holding voltage while the high side switch is in an off state to generate the second voltage.

13. The buck converter of claim 10, wherein the first voltage-to-current conversion circuit is an operational transconductance amplifier and generates the first compensation current according to the second voltage.

14. The buck converter of claim 10, wherein the second voltage-to-current conversion circuit is an operational transconductance amplifier and generates the second compensation current according to the first voltage.

15. The buck converter of claim 10, wherein the voltage adjusting unit comprises:

an unity gain buffer, comprising a positive input terminal coupled to the second adjusting resistor, for receiving the fourth voltage, a negative input terminal, and an output terminal coupled to the negative input terminal, for generating a third voltage; and a first adjusting resistor, coupled to the output terminal of the unity gain buffer and the first input terminal of the comparator, for generating the compensation signal outputted to the first input terminal of the comparator according to the third voltage and the second compensation current.

16. The buck converter of claim 1 further comprising a load, coupled to the signal output end and a ground end.

17. A buck converter with internal ripple compensation, comprising:

a comparator, comprising a first input terminal, a second input terminal, and an output terminal, for comparing signals received by the first input terminal and the second input terminal to generate a comparison result;

a constant-on-time trigger, coupled to the output terminal of the comparator, for generating a trigger control signal according to the comparison result;

a pre-driver, coupled to the constant-on-time trigger, for generating a first pre-driving signal and a second pre-driving signal according to the trigger control signal;

a high side switch, coupled to the pre-driver and a first node;

a low side switch, coupled to the pre-driver and the first node;

an output module, coupled between the first node and a signal output end;

a ripple compensation circuit, coupled to the high side switch, the low side switch, the first node, and the comparator for generating a compensation signal outputted to the comparator; and a ripple generator, coupled to the ripple compensation circuit, for generating a modulated reference voltage according a reference voltage, wherein the ripple compensation circuit comprises:

a current sensing unit, coupled to the first node, for sensing a current passing through the low side switch while the low side switch is in an on state and generating a sensing voltage accordingly;

a first sample-and-hold circuit, coupled to the current sensing unit and a first terminal of the low side switch, for sampling and holding the sensing voltage detected by the current sensing unit to generate a first voltage;

a second sample-and-hold circuit, coupled to the first sample-and-hold circuit and a first terminal of the high side switch, for sampling and holding the first voltage to generate a second voltage;

a first voltage-to-current conversion circuit, comprising a first input terminal coupled to the second sample-and-hold circuit, a second input terminal coupled to the first sample-and-hold circuit, and an output terminal coupled to the first input terminal of the comparator, for generating a compensation current according to the first voltage and the second voltage; and a voltage adjusting unit, coupled to the ripple generator, the output terminal of the first voltage-to-current conversion circuit and the first input terminal of the comparator, for generating the compensation signal outputted to the comparator according to the modulated reference voltage and the compensation current.

18. The buck converter of claim 17, wherein the first input terminal of the comparator is coupled to the ripple compensation circuit, the second input terminal of the comparator is coupled to the signal output end, the output terminal of the comparator is coupled to the constant-on-time trigger, and the comparison result is outputted via the output terminal of the comparator.

19. The buck converter of claim 17, wherein the high side switch is a semiconductor transistor, comprising a first terminal coupled to the pre-driver for receiving the first pre-driving signal, a second terminal coupled to a first power end, and a third terminal coupled to the first node, for controlling an electrical connection between the second terminal of the high side switch and the third terminal end of high side switch according to the first pre-driving signal.

20. The buck converter of claim 17, wherein the low side switch is a semiconductor transistor, comprising a first terminal coupled to the pre-driver for receiving the second pre-driving signal, a second terminal coupled to the first node, and a third terminal coupled to a ground end, for controlling an electrical connection between the second terminal of the low side switch and the third terminal end of the low side switch according to the second pre-driving signal.

21. The buck converter of claim 17, wherein the output module comprises:

an output inductor, coupled between the first node and the signal output end;

an equivalent series resistor, coupled to the signal output end; and an output capacitor, coupled between the equivalent series resistor and a ground end.

22. The buck converter of claim 17, wherein the first sample-and-hold circuit samples the sensing voltage while the low side switch is in an on state and holds at a first holding voltage while the low side switch is in an off state to generate the first voltage.

23. The buck converter of claim 17, wherein the second sample-and-hold circuit samples the first voltage while the high side switch is in an on state and holds at a second holding voltage while the high side switch is in an off state to generate the second voltage.

24. The buck converter of claim 17, wherein the first voltage-to-current conversion circuit is an operational transconductance amplifier and generates the compensation current according to the difference of the first voltage and the second voltage.

25. The buck converter of claim 17, wherein the voltage adjusting unit comprises:
   a unity gain buffer, comprising a positive input terminal coupled to the ripple generator, for receiving the modulated reference voltage, a negative input terminal, and an output terminal coupled to the negative input terminal, for generating a third voltage; and
   a first adjusting resistor, coupled to the output terminal of the unity gain buffer and the first input terminal of the comparator, for generating the compensation signal outputted to the first input terminal of the comparator according to the third voltage and the compensation current.

26. A buck converter with internal ripple compensation, comprising:
   a comparator, comprising a first input terminal, a second input terminal, and an output terminal, for comparing signals received by the first input terminal and the second input terminal to generate a comparison result;
   a constant-on-time trigger, coupled to the output terminal of the comparator, for generating a trigger control signal according to the comparison result;
   a pre-driver, coupled to the constant-on-time trigger, for generating a first pre-driving signal and a second pre-driving signal according to the trigger control signal;
   a high side switch, coupled to the pre-driver and a first node;
   a low side switch, coupled to the pre-driver and the first node;
   an output module, coupled between the first node and a signal output end;
   a ripple compensation circuit, coupled to the high side switch, the low side switch, the first node, and the comparator for generating a compensation signal outputted to the comparator; and
   a ripple generator, coupled to the ripple compensation circuit, for generating a modulated reference voltage according a reference voltage, wherein the ripple compensation circuit comprises:
      a current sensing unit, coupled to the first node, for sensing a current passing through the low side switch while the low side switch is in an on state and generating a sensing voltage accordingly;
      a first sample-and-hold circuit, coupled to the current sensing unit and a first terminal of the low side switch, for sampling and holding the sensing voltage detected by the current sensing unit to generate a first voltage;
      a second sample-and-hold circuit, coupled to the first sample-and-hold circuit and a first terminal of the high side switch, for sampling and holding the first voltage to generate a second voltage;
      a first voltage-to-current conversion circuit, comprising a first input terminal coupled to the second sample-and-hold circuit, a second input terminal coupled to a ground end, and an output terminal, for generating a first compensation current according to the second voltage;
      a second voltage-to-current conversion circuit, comprising a first input terminal coupled to the ground end, a second input terminal coupled to the first sample-and-hold circuit, and an output terminal coupled to the first input terminal of the comparator, for generating a second compensation current according to the first voltage;
      a voltage adjusting unit, coupled to the ripple generator, the output terminal of the first voltage-to-current conversion circuit, the output terminal of the second voltage-to-current conversion circuit, and the first input terminal of the comparator, for generating the compensation signal outputted to the comparator according to the modulated reference voltage and the second compensation current; and
      a second adjusting resistor, coupled to the ripple generator, the output terminal of the first voltage-to-current circuit and the voltage adjusting unit, for generating the fourth voltage according to a reference voltage and the first compensation current.

27. The buck converter of claim 26, wherein the first sample-and-hold circuit samples the sensing voltage while the low side switch is in an on state and holds at a first holding voltage while the low side switch is in an off state to generate the first voltage.

28. The buck converter of claim 26, wherein the second sample-and-hold circuit samples the first voltage while the high side switch is in an on state and holds at a second holding voltage while the high side switch is in an off state to generate the second voltage.

29. The buck converter of claim 26, wherein the first voltage-to-current conversion circuit is an operational transconductance amplifier and generates the first compensation current according to the second voltage.

30. The buck converter of claim 26, wherein the second voltage-to-current conversion circuit is an operational transconductance amplifier and generates the second compensation current according to the first voltage.

31. The buck converter of claim 26, wherein the voltage adjusting unit comprises:
   a unity gain buffer, comprising a positive input terminal coupled to the ripple generator, for receiving the modulated reference voltage, a negative input terminal, and an output terminal coupled to the negative input terminal, for generating a third voltage; and
   a first adjusting resistor, coupled to the output terminal of the unity gain buffer and the first input terminal of the comparator, for generating the compensation signal outputted to the first input terminal of the comparator according to the third voltage and the second compensation current.

32. The buck converter of claim 26, wherein the ripple generator generates the modulated reference voltage outputted to the ripple compensation circuit according to the fourth voltage.

33. The buck converter of claim 17 further comprising a load, coupled to the signal output end and a ground end.

34. The buck converter of claim 10, wherein the first input terminal of the comparator is coupled to the ripple compensation circuit, the second input terminal of the comparator is coupled to the signal output end, the output terminal of the comparator is coupled to the constant-on-time trigger, and the comparison result is outputted via the output terminal of the comparator.

35. The buck converter of claim 10, wherein the high side switch is a semiconductor transistor, comprising a first terminal coupled to the pre-driver for receiving the first pre-driving signal, a second terminal coupled to a first power end, and a third terminal coupled to the first node, for controlling an electrical connection between the second terminal of the high side switch and the third terminal end of high side switch according to the first pre-driving signal.

36. The buck converter of claim 10, wherein the low side switch is a semiconductor transistor, comprising a first terminal coupled to the pre-driver for receiving the second pre-driving signal, a second terminal coupled to the first node, and a third terminal coupled to a ground end, for controlling an electrical connection between the second terminal of the low side switch and the third terminal end of the low side switch according to the second pre-driving signal.

37. The buck converter of claim 10, wherein the output module comprises:
   an output inductor, coupled between the first node and the signal output end;
   an equivalent series resistor, coupled to the signal output end; and
   an output capacitor, coupled between the equivalent series resistor and a ground end.

38. The buck converter of claim 10 further comprising a load, coupled to the signal output end and a ground end.

39. The buck converter of claim 26, wherein the first input terminal of the comparator is coupled to the ripple compensation circuit, the second input terminal of the comparator is coupled to the signal output end, the output terminal of the comparator is coupled to the constant-on-time trigger, and the comparison result is outputted via the output terminal of the comparator.

40. The buck converter of claim 26, wherein the high side switch is a semiconductor transistor, comprising a first terminal coupled to the pre-driver for receiving the first pre-driving signal, a second terminal coupled to a first power end, and a third terminal coupled to the first node, for controlling an electrical connection between the second terminal of the high side switch and the third terminal end of high side switch according to the first pre-driving signal.

41. The buck converter of claim 26, wherein the low side switch is a semiconductor transistor, comprising a first terminal coupled to the pre-driver for receiving the second pre-driving signal, a second terminal coupled to the first node, and a third terminal coupled to a ground end, for controlling an electrical connection between the second terminal of the low side switch and the third terminal end of the low side switch according to the second pre-driving signal.

42. The buck converter of claim 26, wherein the output module comprises:
   an output inductor, coupled between the first node and the signal output end;
   an equivalent series resistor, coupled to the signal output end; and
   an output capacitor, coupled between the equivalent series resistor and a ground end.

43. The buck converter of claim 26 further comprising a load, coupled to the signal output end and a ground end.

* * * * *